(12) United States Patent
Mackin et al.

(10) Patent No.: US 7,416,197 B2
(45) Date of Patent: Aug. 26, 2008

(54) PERSONAL RECREATIONAL VEHICLE WITH ROTATABLE SEAT

(76) Inventors: Stephen Mackin, 1005 Park Place LN., Jonesboro, GA (US) 30236; Ernest Newton, 1005 Park Place LN., Jonesboro, GA (US) 30236

( * ) Notice: Subject to any disclaimer, the term of this patent is extended or adjusted under 35 U.S.C. 154(b) by 415 days.

(21) Appl. No.: 11/146,626

(22) Filed: Jun. 7, 2005

(65) Prior Publication Data

US 2005/0269793 A1 Dec. 8, 2005

Related U.S. Application Data

(60) Provisional application No. 60/577,964, filed on Jun. 8, 2004.

(51) Int. Cl.
*B62M 1/00* (2006.01)
(52) U.S. Cl. .............. 280/87.041; 280/87.021; 297/5; 297/344.21
(58) Field of Classification Search ............. 280/87.01, 280/87.021, 87.041, 87.3, 87.03, 87.042; 297/5, 344.21, 344.26; 190/122, 113, 111
See application file for complete search history.

(56) References Cited

U.S. PATENT DOCUMENTS

| | | | | |
|---|---|---|---|---|
| 1,269,107 A * | 6/1918 | Moomaw | ............... | 280/87.041 |
| D57,894 S * | 5/1921 | Eklund | ............... | D21/423 |
| 1,535,167 A * | 4/1925 | Lovell | ............... | 280/87.021 |
| 1,611,307 A * | 12/1926 | Forse | ............... | 280/87.021 |
| 1,658,068 A * | 2/1928 | White | ............... | 280/87.041 |
| 1,852,012 A * | 4/1932 | Hose | ............... | 297/344.26 |
| 2,439,556 A * | 4/1948 | Bancroft | ............... | 280/87.041 |
| 2,528,950 A * | 11/1950 | Engstrom | ............... | 5/402 |
| 2,587,679 A * | 3/1952 | Atkinson | ............... | 296/68 |
| 3,718,365 A * | 2/1973 | Gibson | ............... | 297/344.24 |
| 4,062,588 A * | 12/1977 | Draney | ............... | 297/468 |
| 4,611,818 A * | 9/1986 | Cammarata | ............... | 280/278 |
| 4,861,051 A * | 8/1989 | Napper | ............... | 280/87.021 |
| 4,865,382 A * | 9/1989 | Marshall | ............... | 297/195.11 |
| 5,318,339 A * | 6/1994 | Cherniak | ............... | 297/344.26 |
| 5,364,163 A * | 11/1994 | Hardison | ............... | 297/344.21 |
| 5,688,024 A * | 11/1997 | Arizpe-Gilmore | ............... | 297/217.1 |
| 5,992,864 A * | 11/1999 | Dickson et al. | ............... | 280/87.041 |
| 6,120,044 A * | 9/2000 | Tsai | ............... | 280/87.05 |
| 6,149,170 A * | 11/2000 | Dotson | ............... | 280/87.021 |
| 6,234,501 B1 * | 5/2001 | Chen | ............... | 280/87.041 |
| 6,450,516 B1 * | 9/2002 | Nall, III | ............... | 280/87.041 |
| 6,494,470 B2 * | 12/2002 | Chang | ............... | 280/87.041 |
| 6,517,092 B2 * | 2/2003 | Humphrey | ............... | 280/87.041 |
| 6,609,584 B2 * | 8/2003 | Patmont et al. | ............... | 180/220 |
| 6,808,188 B1 * | 10/2004 | Fan | ............... | 280/87.041 |
| 6,866,275 B1 * | 3/2005 | Puzey | ............... | 280/87.05 |
| 2004/0032105 A1 * | 2/2004 | Tsai | ............... | 280/87.041 |

* cited by examiner

*Primary Examiner*—Christopher P. Ellis
*Assistant Examiner*—John D Walters
(74) *Attorney, Agent, or Firm*—Donald W. Meeker

(57) ABSTRACT

A frame has a foot support and rear wheel support for two rear wheels spaced apart for stability. A front steering column, pivotally attached to the frame, may have a single wheel or spaced apart double wheels for greater stability for a four wheel vehicle. A seat support pedestal extends upwardly from the frame near the back to support a rotatable seat.

22 Claims, 4 Drawing Sheets

PERSONAL RECREATIONAL VEHICLE WITH ROTATABLE SEAT

CLAIM OF PROVISIONAL APPLICATION RIGHTS

This application claims the benefit of U.S. Provisional Patent Application No. 60/577,964, filed on Jun. 08, 2004.

BACKGROUND OF THE INVENTION

1. Field of the Invention

The present invention relates to rider propelled vehicles and particularly to a scooter having a front wheel attached to a steering column, a deck, two rear wheels for stability and a rotatable seat on a seat support extending upwardly from the deck.

2. Description of the Prior Art

Scooters have long been a favored mode of transportation for children. Most scooters are made with a front steerable wheel and a rear wheel. Three wheel scooters include a steerable front wheel and two spaced apart rear wheels, together with a support platform located between the front and rear wheels. This platform is mounted at the same level or is depressed below the level of the wheel axles to provide a low center of gravity. The handle bars for steering the front wheel are mounted atop a vertical support located at the front end of the vehicle for access by a child standing on the platform. Due to the forward location of the handle bars, the child tends to maintain his or her weight on the platform near the middle of the scooter. As a consequence, all three vehicle wheels are in continuous contact with the ground, so the vehicle tends to remain upright and is resistant to tipping forces.

While some recreational vehicles provide seats, the prior art patents do not provide a rotatable seat on a scooter to enhance the fin value and potential activities and maneuvers possible with a rotatable seat.

U.S. Pat. No. 2,439,556, issued Apr. 13, 1948 to Bancroft, discloses a two-wheeled scooter having a folding seat structure.

U.S. Pat. No. 1,611,307, issued Dec. 21, 1926 to Forse, indicates a combination seat and vehicle stand for a scooter.

U.S. Pat. No. 1,269,107, issued Jun. 11, 1918 to Moomaw, puts forth scooter-type vehicle having four wheels and a fold-down seat.

U.S. Pat. No. 1,658,068, issued Feb. 7, 1928 to White, concerns a two-wheeled toy with a collapsible seat and steering column.

U.S. Pat. No. 6,808,188, issued Oct. 26, 2004 to Fan, illustrates a steerable scooter that includes a single front wheel as well as two rear wheels that provide for leaning and directional control, with the front wheel and rear wheels arranged in a three-point, constant triangular formation that enables exceptional scooter stability and handling. Further, assisting wheels are installed on two sides at the bottom end of a rearwardly inclined front stem that are disposed marginally higher than and simultaneously articulated with the front wheel. Since the assisting wheels and front wheel form a triangular formation that is wide at the interior and narrow at the posterior, when the handlebar is turned for a larger angle, the arrangement is capable of effectively preventing slide out due to loss of lateral traction. Additionally, a freely adjustable and removable saddle is installed on the frame and the two rear wheels are equipped with a synchronized brake mechanism to allow safe riding and, furthermore, the option of enjoying the scooter of the present invention while seated or standing on one foot.

U.S. Pat. No. 6,450,516, issued Sep. 17, 2002 to Nall, provides a steerable scooter including a standing platform supported on a rollable rear support wheel, a steerable front support wheel, and adjustable seat assembly. The scooter includes a support platform positioned below the top surface of the support wheels. In addition, the scooter includes an adjustable seat that has a top surface positionable two or more inches below the top surface of the support wheels.

U.S. Pat. No. 1,535,167, issued Apr. 28, 1925 to Lovell, shows a two-wheeled scooter with an adjustable seat.

U.S. Pat. No. D57,894, issued May 17, 1921 to Eklund, provides the ornamental design for a scooter with two rear wheels and a fold-down seat and steering column for compact storage.

What is needed is an addition of a rotatable seat to a scooter which allows the occupant to spin freely in a chosen direction while the vehicle is in motion to improve upon the recreational possibilities and enjoyment of the familiar scooter.

SUMMARY OF THE INVENTION

A primary object of the present invention is to improve upon the recreational possibilities and enjoyment of the familiar scooter by the addition of a rotatable seat which allows the occupant to spin freely in a chosen direction while the vehicle is in motion. The preferred embodiment of the invention allows the rider to propel the vehicle forward under the rider's own power using feet and legs while standing or while seated.

Another object of the present invention is to increase the stability of the vehicle by providing a pair of spaced apart wheels on the rear portion of the frame. The rear portion of the invention's footboard is "flared", in that it is of a significantly wider base as compared to the front portion. The spacing of the rear wheels is such that the vehicle will not readily tip over in response to the centrifugal force applied to the vehicle when the occupant is rotating and also turning the vehicle in a like direction. Additionally, the widened portion of the vehicle's footboard is sufficiently removed from the area in which the rider must place his or her foot on the ground to propel or stop the vehicle, thereby allowing the rider to operate the vehicle without hindrance.

An additional object of the present invention is to allow the rider to revolve while seated using a number of different techniques and methods. The rider may push against the vehicle's footboard with his feet to set the rotating seat in motion, or the rider may push against the ground to achieve the same rotation. Also, the rider may grasp the steering handles and swivel his weight around the axis of the seat pedestal, rotating freely without his or her legs or feet coming into contact with the vehicle or with the ground. Each of these techniques can be easily and safely performed while still maintaining control over the speed and direction of the vehicle.

Yet another object of the present invention is to allow the rider to preserve and easily convert between a number of different seated positions while operating the vehicle. Once the rider achieves a desired forward momentum and begins to ride the vehicle while seated, the rotational nature of the seat allows the rider to ride facing any direction, wholly independent from the direction of the vehicle itself. This function of the invention allows many enjoyable and unique ways of riding the vehicle that are not possible or safe utilizing existing forms of scooters or other seated vehicles.

In brief, the recreational personal vehicle of the present invention comprises a frame with a foot support or footboard and rear wheel support for two rear wheels spaced apart for stability. A front steering column, pivotally attached to the frame, may have a single wheel or spaced apart double wheels for greater stability for a four wheel vehicle. A seat support pedestal extends upwardly from the frame near the back to support a rotatable seat which enables many fun and challenging maneuvers while riding.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
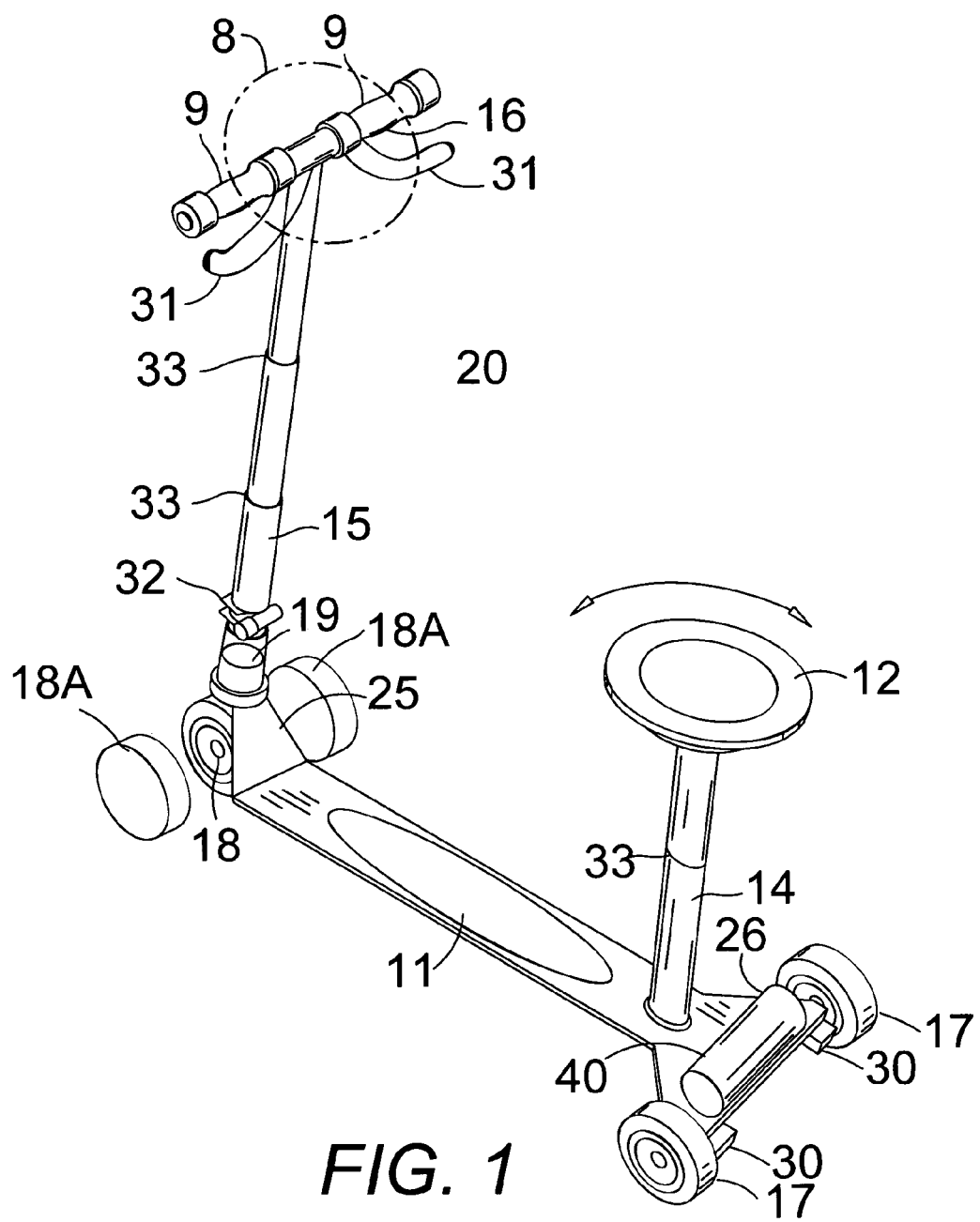
FIG. 1 is a perspective view of a personal vehicle with rotating seat of a preferred embodiment in accordance with the present invention.

In FIGS. 1-7 a recreational personal vehicle 20 and 20A comprises a frame 11 and 11A supporting a front steering column 15 and front wheel 18, a pair of rear wheels 17 and a rotatable seat 12 and seat support pedestal 14 and 14A.

Figure 2:
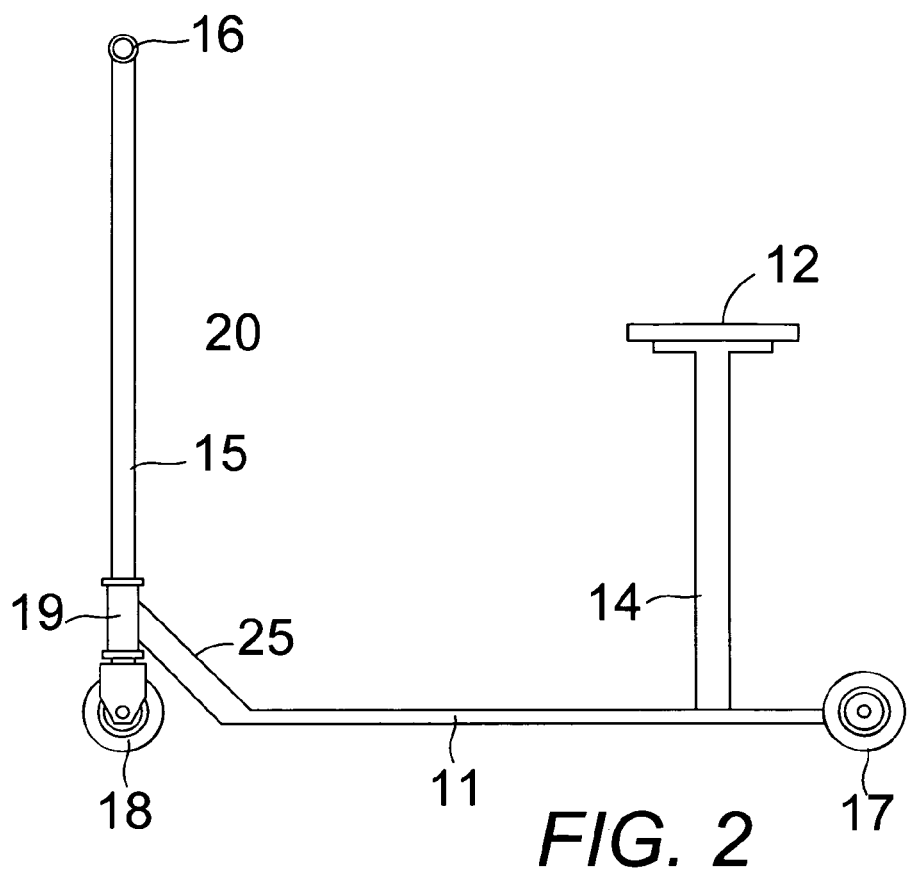
FIG. 2 is a side plan view of the vehicle depicted in FIG. 1.
Figure 3:
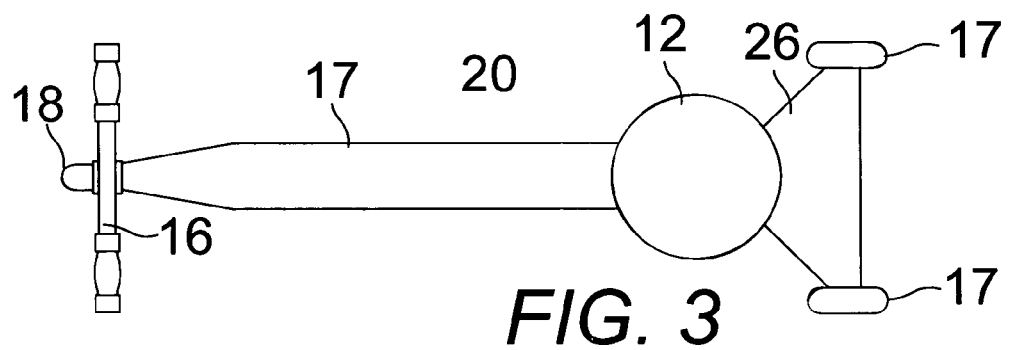
FIG. 3 is a top plan view of the vehicle depicted in FIG. 1.

In FIGS. 1-3, the frame comprises an elongated foot support portion 11 comprising an elongated flat metal plate for receiving the feet of a rider and a rear wheel support portion 26 comprising a rigid extension of the footboard portion extending laterally from both sides of a rear end of the frame. The rear wheel support portion 26 is shaped like a truncated isosceles triangle with the truncated top of the triangle adjacent to the footboard portion 11 and the two sides of the triangle angled back and out from the footboard portion to a back end of the frame forming a base of the triangle perpendicular to a longitudinal centerline of the frame. The pair of rear wheels 17 are each attached to an outer end of the rear wheel support portion 26 spaced apart from a centerline of the frame a sufficient distance for lateral stability with each of the rear wheels having an axle, which may be a shared axle, parallel and adjacent to the rear base of the triangle and a set of roller bearings between the axle and the wheel or other standard rotating means.

In FIGS. 1-3, the front steering column 15 is attached to a front end of the frame by a steering column attaching means of allowing pivoting of the steering column relative to the frame, preferably a vertical sleeve 19 attached to the frame on an upwardly angled section 25 of the foot support portion to receive the steering column 15 rotatably in the sleeve 19. The steering column may comprise a rigid metal T-shaped shaft with hand grips 9 on the two arms of the T 16 or a rigid metal elongated shaft 15 with a steering wheel 8, shown dashed in FIG. 1, at a top end or other desired configuration.

The front wheel 18 is attached to a bottom of the steering column 15 by a standard means to allow rotation of the front wheel relative to the steering column such as an axle and roller bearings. The vehicle may further comprise an additional front wheel to create two front wheels 18A spaced apart forming a four wheeled vehicle for greater stability.

Figure 4:
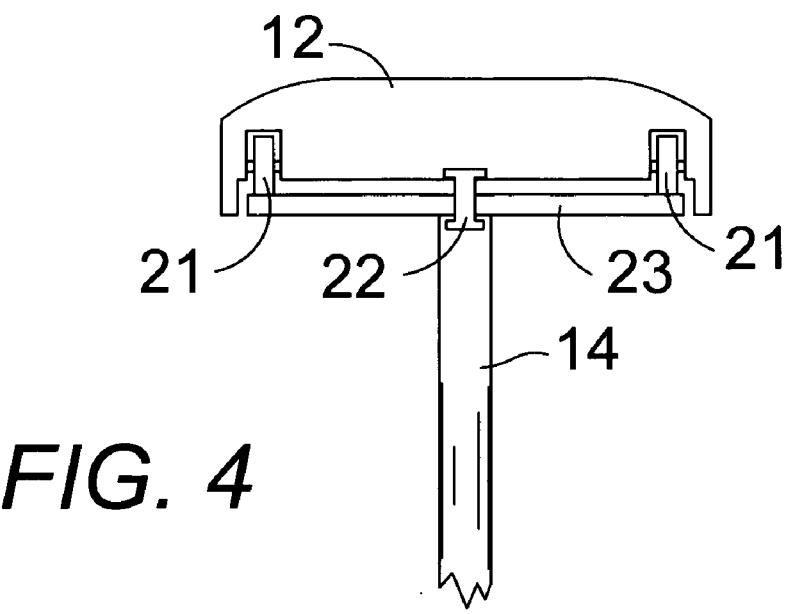
FIG. 4 is a cross-sectional side view of a rotating seat assembly of a preferred embodiment in accordance with the present invention.
Figure 5:
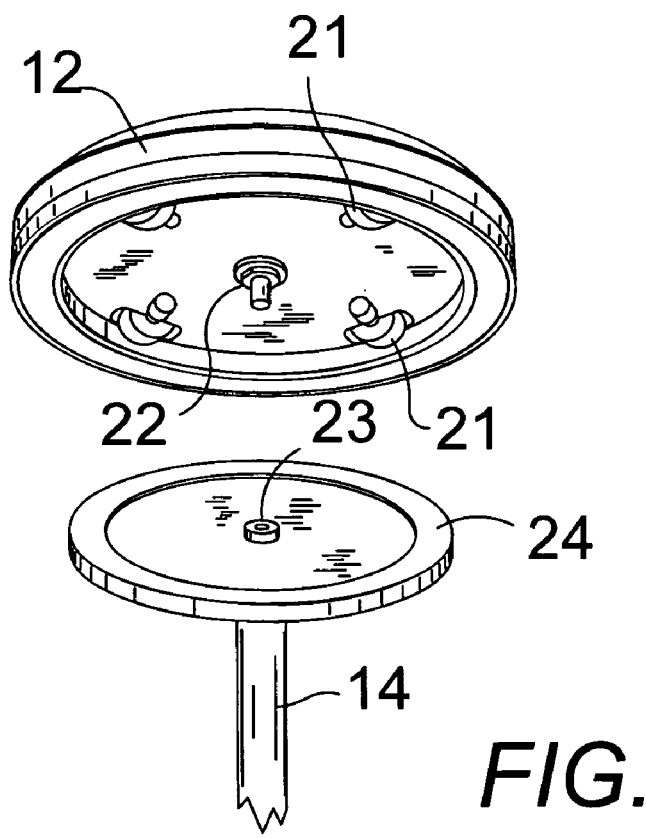
FIG. 5 is an exploded perspective view of the rotating seat assembly disassembled to show the details of construction.

The elongated seat supporting pedestal 14 is rigidly attached to the frame by welding or other means on a rear portion of the footboard portion 11 extending upwardly therefrom. In FIGS. 4 and 5, a rotatable seat 12 is attached to a top of the seat supporting pedestal 14 by a means of allowing free rotation of the rotatable seat relative to the seat supporting pedestal with a rider mounted on the seat, such as a kingpin 22 secured to the seat support pedestal and to a bottom of the seat so that the seat 12 freely rotates relative to the sea support pedestal 14, a horizontal plate 23 attached to the kingpin, and an annular array of rolling elements, such as pivotally attached rollers or wheels 21 between the plate and a bottom of the rotatable seat. An annular track 24 on a top surface of the horizontal plate 23 receives the rollers or wheels 21 rolling around the track 24. The annular array of rolling elements may comprise ball bearings. The seat 12 may further comprise a top padded portion 7, as shown in FIGS. 6 and 7, removably attachable and replaceable by a variety of top padded portions of different sizes and shapes.

Figure 6:
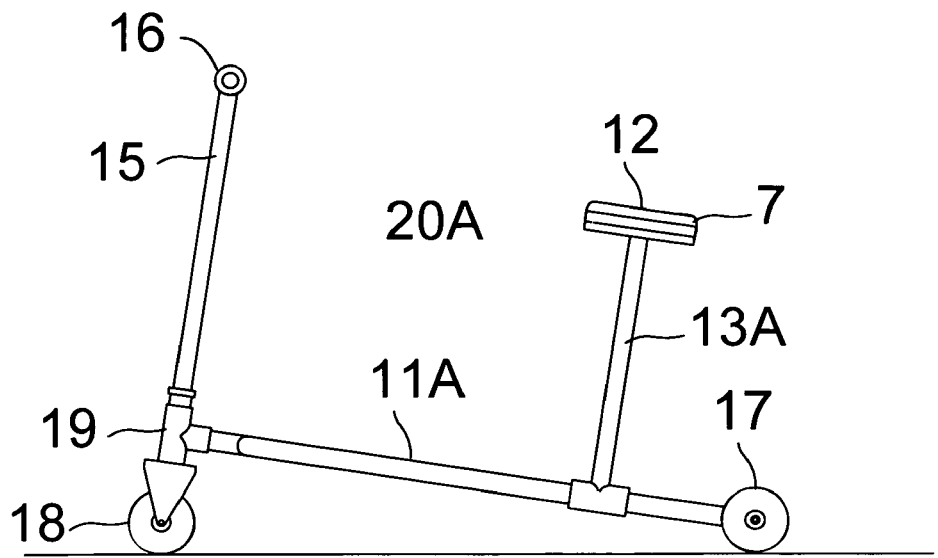
FIG. 6 is a side elevational view of an alternate embodiment of the personal vehicle of the invention with a sloping frame.
Figure 7:
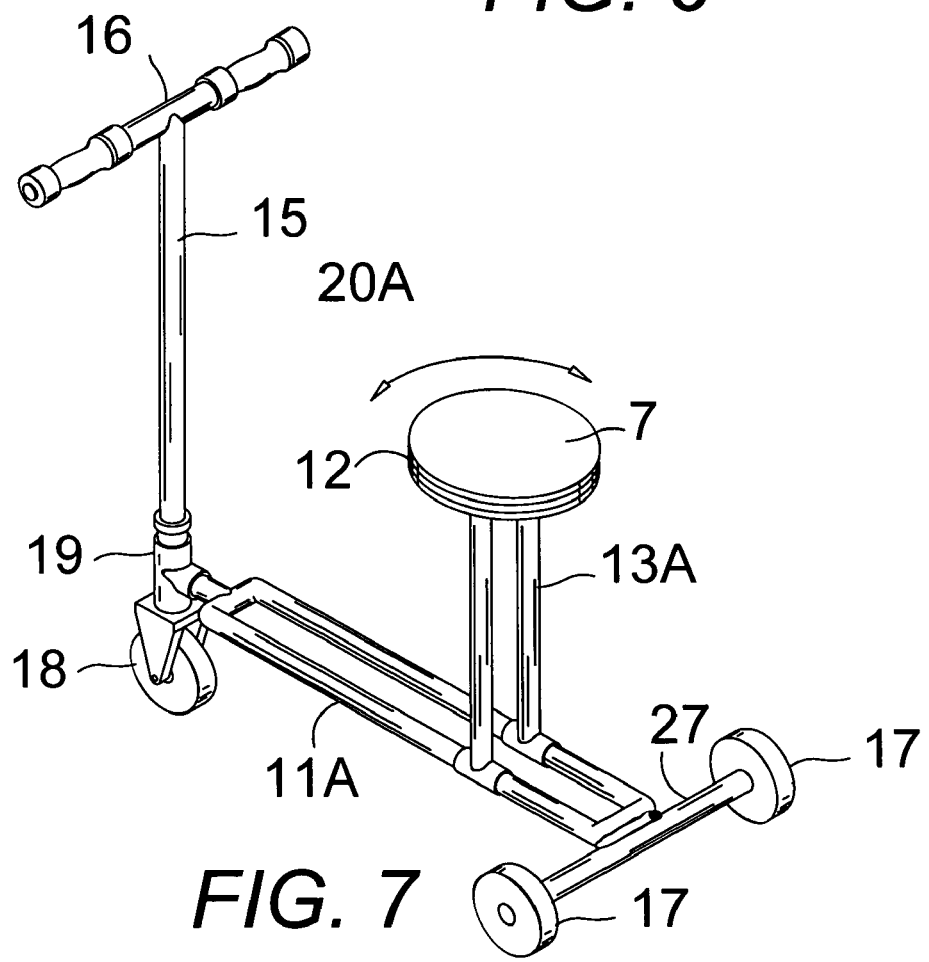
FIG. 7 is a perspective view of the alternate embodiment of the personal vehicle of FIG. 6 showing the double bar frame and double bar support for the rotating seat assembly and an elongated axle extending from the back of the frame for attaching the pair of rear wheels.

In an alternate embodiment of FIGS. 6 and 7, the frame 11A, which is also the foot support portion, comprises a pair of parallel spaced elongated metal rods sloping downwardly from the front steering column attaching sleeve 19 to the rear wheels 17. The rear wheel support portion comprises an axle 27 extending from a rear of the frame outwardly on both sides of the frame and the rear wheels 17 are attached rotatably to the two ends of the axle with roller bearings or other standard rotatable means. The seat support pedestal 13A comprises a spaced apart pair of vertical metal rods each on rigidly attached to one of the sloping metal rods of the frame 11A.

A variety of accessory items and variations of the previously described elements are possible, such as a brake means 30, which may be friction pads, on the rear wheels 17 operated by hand levers 31 or a foot lever, not shown, for stopping the vehicle.

The steering column 15 may further comprising a hinge means 32 of folding down the steering column for flat storage.

Both the steering column and the seat support pedestal may have telescoping pole sections 33 adjustable in height to accommodate different sizes of riders or to vary for altering the center of gravity for various maneuvers.

A means of powering the vehicle 40, such as an electric or gas motor, may be provided for a self-propelled vehicle.

In use, the present invention described above is operated by a single rider who propels the vehicle by pushing against the ground with one foot and standing on the footboard 11 with the opposite foot. Alternately, an occupant may propel the vehicle by pushing against the ground with one foot while seated on the rotating seat 12.

The operator of the vehicle controls the direction of the vehicle by grasping the steering handles 16 and turning them in the desired direction.

The operator of the vehicle alters the direction he or she is facing by shifting his or her weight around the axis of the seat pedestal 11 while seated on the rotating seat 12. This is accomplished primarily by pushing against the ground or the footboard 11 with his or her feet or by pushing or pulling the steering handles 16.

The components are preferably fabricated of lightweight aluminum tubing and plates or stainless steel tubing with synthetic wheels.

It is understood that the preceding description is given merely by way of illustration and not in limitation of the invention and that various modifications may be made thereto without departing from the spirit of the invention as claimed.

What is claimed is:

1. A recreational personal vehicle comprising:
a frame comprising an elongated foot support portion for receiving the feet of a rider and a rear wheel support portion extending laterally from both sides of a rear end of the frame, a steering column attached to a front end of the frame by a steering column attaching means of allowing pivoting of the steering column relative to the frame, a front wheel attached to a bottom of the steering column by a means to allow rotation of the front wheel relative to the steering column, a pair of rear wheels each attached to an outer end of the rear wheel support spaced apart from a centerline of the frame a sufficient distance for lateral stability, each of the rear wheels attached by a means to allow pivoting of the wheel relative to the frame, an elongated seat supporting pedestal rigidly attached to the frame on a rear portion of the footboard portion extending upwardly therefrom, a rotatable seat attached to a top of the seat supporting pedestal by a means of allowing free rotation of the rotatable seat relative to the seat supporting pedestal with a rider mounted on the seat.

2. The vehicle of claim 1 wherein the means of allowing free rotation of the rotatable seat comprises a kingpin secured to the seat support pedestal and to a bottom of the seat so that the seat freely rotates the seat support pedestal, a horizontal plate attached to the kingpin, and an annular array of rolling elements between the plate and a bottom of the rotatable seat.

3. The vehicle of claim 2 further comprising an annular track on a top surface of the horizontal plate and the annular array of rolling elements comprises a number of circumferentially spaced rollers mounted on a bottom of the rotatable seat in a position to run on the annular track, each of the rollers mounted to the bottom of the rotatable seat by a means to allow rotation of the roller on the annular track.

4. The vehicle of claim 3 wherein the annular array of rolling elements comprises ball bearings.

5. The vehicle of claim 3 wherein the annular array of rolling elements comprises a series of rotatable wheels.

6. The vehicle of claim 1 wherein the seat further comprises a top padded portion removably attachable and replaceable by a variety of top padded portions of different sizes and shapes.

7. The vehicle of claim 1 wherein the rear wheel support portion comprises a rigid extension of the footboard portion.

8. The vehicle of claim 1 wherein the frame comprises an elongated flat metal plate.

9. The vehicle of claim 8 wherein the rear wheel support portion is shaped like a truncated isosceles triangle with the truncated top of the triangle adjacent to the footboard portion and the two sides of the triangle angled back and out from the footboard portion to a back end of the frame forming a base of the triangle perpendicular to a longitudinal centerline of the frame.

10. The vehicle of claim 9 wherein the rear wheels are each attached to the rear wheel support portion by an axle parallel and adjacent to the rear base of the triangle.

11. The vehicle of claim 1 wherein the frame comprises a pair of parallel spaced elongated metal rods sloping downwardly from the front steering column attaching means to the rear wheels.

12. The vehicle of claim 1 wherein the rear wheel support portion comprises an axle extending from a rear of the frame outwardly on both sides of the frame and the rear wheels are attached rotatably to the two ends of the axle.

13. The vehicle of claim 1 wherein the steering column attaching means of allowing pivoting of the steering column relative to the frame comprises a vertical sleeve attached to the frame to receive the steering column.

14. The vehicle of claim 1 wherein the steering column comprises a rigid metal T-shaped shaft with hand grips on the two arms of the T.

15. The vehicle of claim 1 wherein the steering column comprises a rigid metal elongated shaft with a steering wheel at a top end.

16. The vehicle of claim 1 wherein the seat support pedestal comprises a spaced apart pair of vertical metal rods.

17. The vehicle of claim 1 further comprising a brake means for stopping the vehicle.

18. The vehicle of claim 1 further comprising a hinge means of folding down the steering column for flat storage.

19. The vehicle of claim 1 wherein the steering column is a telescoping pole adjustable in height.

20. The vehicle of claim 1 wherein the seat support pedestal comprises at least one telescoping pole adjustable in height.

21. The vehicle of claim 1 further comprising a means of powering the vehicle.

22. The vehicle of claim 1 further comprising an additional front wheel to create two front wheels spaced apart forming a four wheeled vehicle for greater stability.

* * * * *